Inventor
Fred W. Rohr
By Hume, Clement,
Hume & Lee
Attorneys

United States Patent Office

3,619,985
Patented Nov. 16, 1971

3,619,985
METHOD FOR TREATING HEATED GASES TO SUPPRESS STEAM PLUME FORMATION
Fred W. Rohr, Western Springs, Ill., assignor to
P & W Engineers, Inc., Chicago, Ill.
Filed Nov. 26, 1968, Ser. No. 779,114
Int. Cl. B01d 47/00
U.S. Cl. 55—89        2 Claims

ABSTRACT OF THE DISCLOSURE

A method and system are disclosed for removing particulate matter from combustion gases and for concomitantly suppressing steam plume formation. A scrubber passes a fluid through the combustion gases to remove particulate matter therefrom and, preferably, introduces the fluid under conditions such that the temperature of the combustion gases are reduced substantially below their dew point; this latter action dehydrates the gases by condensation of the water vapor carried thereby. The relatively hot and contaminant bearing fluid discharged from the scrubber is circulated through a heat exchanger whereat it is utilized to preheat ambient air which is then intermixed with the dehydrated combustion gases delivered to the scrubber output. The intermixed air and combustion gases are discharged to the atmosphere through a conventional stack. The relatively hot scrubber fluid, cooled by its passage through the heat exchanger, is recirculated to the scrubber for repeated use, preferably after the fluid has been suitably clarified. Other features are disclosed.

CROSS-REFERENCE TO RELATED APPLICATION

The present application discloses subject matter similar to that disclosed and claimed in a concurrently filed application, Ser. No. 779,012—Rohr, entitled "Method and System for Treating Combustion Gases" and assigned to the same assignee as the present invention.

BACKGROUND OF THE INVENTION

The present invention relates generally to apparatus and methods for treating combustion gases and, more particularly, is directed to thermodynamic methods and systems for removing particulate matter from such gases while also suppressing steam plume formation upon discharge of the gases to the atmosphere.

Air pollution in recent years has become a problem of national importance with substantial attention being focused on means and methods for eliminating or at least substantially alleviating the quantity of particulate matter emitted from the chimneys of industrial furnaces, municipal incinerators and the like. In those instances where conventional water scrubbing systems or similar air pollution control means are used in removing the particulate matter, a large quantity of moisture in the form of water vapor is introduced into the gases, this moisture being in addition to that inherently generated as a byproduct of the combustion process, released from the burning matter, or produced by quenching of the burned residue. Condensation of this water vapor occurring upon contact of the combustion gases with the relatively cool ambient air often results in a visible steam plume emission from the chimney or stack of the system. Although such visible steam emissions may be comparatively free from harmful contaminants or other particulate matter, there is a form of aesthetic pollution and objection is still encountered to the system operation because it continues to appear, to the layman at least, that the harmful pollution has not been abated.

SUMMARY OF THE INVENTION

It is therefore a primary objective of the present invention to provide a combined system that both removes the particulate matter from the combustion gases and prevents formation of an objectionable steam plume upon discharge of the cleansed combustion gases to the atmosphere.

It is a further and more specific purpose of the invention to provide such combined systems wherein the apparatus and method steps for steam plume suppression and contaminant removal are intimately correlated with one another so that an optimum economy and efficiency of system operation is obtained.

Accordingly, one facet of the present invention relates to apparatus for treating combustion gases emitted from the furnace means of a fuel combustion system. More particularly, this apparatus comprises an air pollution control means coupled to the furnace means and adapted to introduce a scrubbing fluid into the combustion gases for collecting and removing the particulate matter therefrom. Output means are coupled to the pollution control means and are adapted for conducting the cleansed combustion gases to the atmosphere. A heat exchanger means is provided with first and second separate flow passageways in intimate thermal contact with one another, the first heat exchanger passageway being adapted to conduct ambient air to the output means for intermixture with the scrubbed combustion gases prior to their discharge to the atmosphere and the second passageway being adapted to recirculate the relatively hot fluid that has been passed through the pollution control means. The heat exchanger effects, by thermal contact of the ambient air and the hot scrubbing fluid, a desired preheating of the ambient air and a desired recooling of the scrubbing fluid prior to its reuse in the pollution control means.

In accordance with the method of the invention, the combustion gases emitted from the furnace means are scrubbed with a fluid for removing particulate matter therefrom after which they are cooled substantially below their dew point temperature for correspondingly reducing the moisture content of the combustion gas through condensation of the water vapor carried by the gas. A predetermined quantity of ambient air is preheated by thermal contact with the used scrubber fluid and after intermixing of the preheated ambient air with the scrubbed combustion gases the gas mixture is discharged to the atmosphere absent impurities and with an optically clear stack emission. The scrubber fluid used in preheating the ambient air is cooled by the thermal contact with the air and is recirculated for repeated use in scrubbing the combustion gases.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
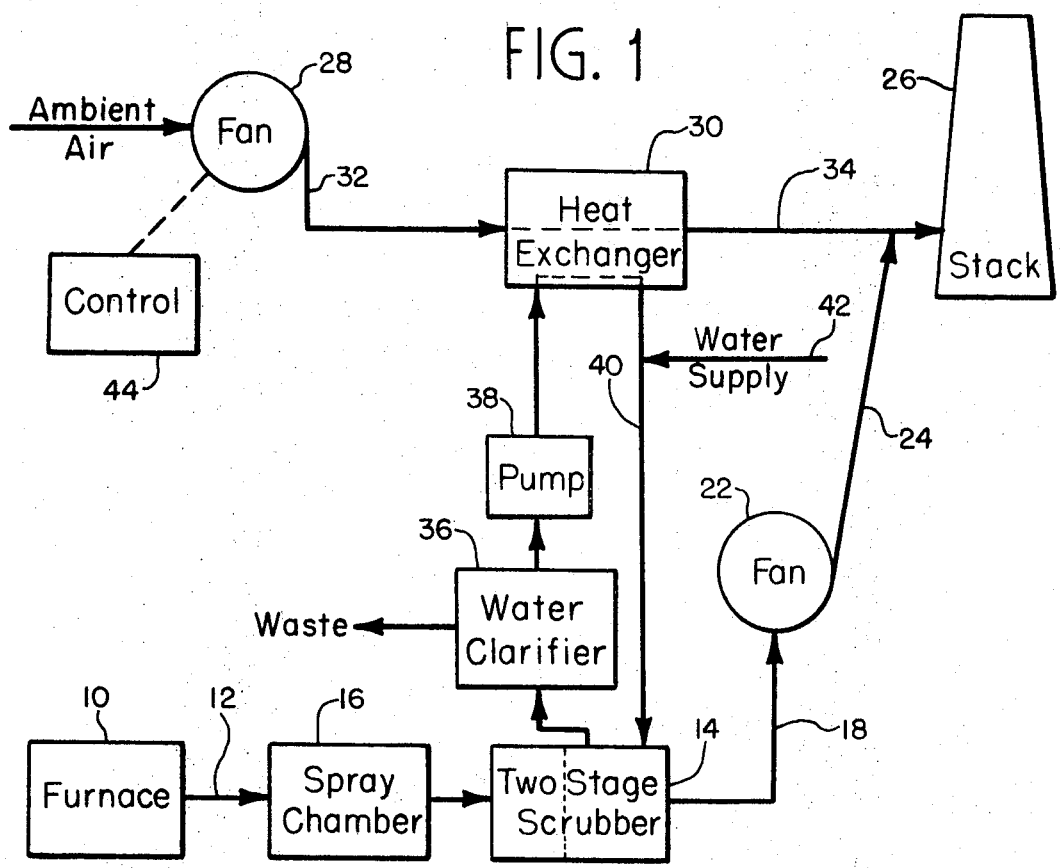
FIG. 1 is a schematic block diagram of a preferred embodiment of the present invention.

Referring now to FIG. 1, the gas treatment system there shown comprises a conventional furnace means 10 such as industrial process furnace, municipal incinerator or the like. The furnace 10 develops at an outlet duct, schematically indicated in the drawing by the arrow 12, combustion gases of an intense heat and carrying a substantial quantity of particulate matter such as fly ash, soot and other objectionable contaminants. The specific character of the matters borne by the flue gases is, of course, dependent on the type of products being burned and the furnace burning process as well as certain other factors as is well understood to those skilled in the art. The combustion gases discharged to the outlet 12 also contain a significant quantity of moisture generated as a by-product of the combustion process, released from moisture in the products being burned and, in certain furnaces, developed as a consequence of quenching of the burned residue in the ash conveyor trough.

In order to remove the obnoxious flue gas constituents, the combustion gases are directed to a conventional scrubber unit 14 or similar air pollution control means. It is, however, often necessary to first precool the intensely hot combustion gases to a level acceptable to the metallurgical standards of the scrubber 14 before introducing the gases therein. To this end, a spray chamber 16 is interposed between the outlet conduit 12 of the furnace 10 and the inlet of scrubber 14. The spray chamber 16 is of conventional design and operation providing a cooling water spray through the gases which both cools and adds further moisture to the combustion gases.

A scrubbing fluid, preferably water, is sprayed or otherwise brought into intimate contact with the combustion gases in the scrubber 14 in order to collect and remove the particulate matter therefrom. As will presently be explained in detail, the scrubber 14 is preferably divided into two distinct stages, as denoted schematically by the dashed line dividing the block 14, and each scrubber stage is provided with an individual water clarification and recirculation system. The combustion gases leave the scrubber 14 along an outlet conduit 18 in a cleansed condition and at a very substantially reduced temperature. In accordance with the invention and as will be explained in greater detail later herein, the scrubber 14 also cools the gases substantially below their dew point resulting in an effective dehydration of the gases by condensation of a substantial portion of the water vapor carried thereby. The gases at the scrubber outlet 18 are conveyed by a conventional induced draft fan 22 and connecting conduit 24 to an output means including a conventional chimney or stack 26.

The combustion gases delivered to the chimney 26 along the outlet conduit 24 may still, however, contain sufficient moisture to result in formation of a steam plume upon discharge of the gases to the atmosphere. Accordingly, and in further conformity with the teachings of the present invention, preheated ambient air in a predetermined quantity is intermixed with the combustion gases exiting from the conduit 24 prior to discharge of the combustion gases from the stack 26. The ambient air is preheated sufficiently to assure that it is of a lower humidity than that of the combustion gases and is intermixed with the combustion gases in a quantity adequate to preclude formation of a steam plume.

More particularly, the ambient air enters the system through an induced draft fan 28 and is coupled to a heat exchanger means 30 along an entry conduit schematically indicated in the drawing by the arrow 32. The heat exchanger 30 is of conventional construction including first and second flow passageways in intimate thermal contact with one another. The first passageway conducts the ambient air from the inlet 32 to an outlet conduit 34 that joins with the combustion gas outlet conduit 24 at the entry to the stack 26. The second passageway of the heat exchanger 30 is adapted to receive the relatively hot scrubber fluid, i.e. water, that has been heated during cleansing and cooling of the combustion gases in the scrubber stage 14. This relatively hot water is effective within the heat exchanger 30 to significantly increase the temperature of the ambient air at the outlet conduit 34 over that of the air entering the heat exchanger along the inlet conduit 32. Consistent with well understood thermodynamic principles, the scrubber fluid at the outlet of the second passageway is reduced in heat content by an amount corresponding to the increase in heat content of the air, ignoring minor heat losses. This recooling of the scrubber fluid prepares it for recirculation to the second stage of the scrubber 14 where it is again used in cooling and cleaning the combustion gases.

In order to further condition the scrubber fluid for recirculation to the scrubber 14 and to obviate clogging or chemical damage to the heat exchanger 30, a water clarifier system 36 is interposed between the fluid outlet of the second stage of the scrubber 14 and the inlet of the second passage of the heat exchanger 30. The clarifier 36 is of a type having a relatively short retention time so that scrubber fluid is not cooled excessively prior to entry into the heat exchanger. A conventional pump 38 following the clarifier 36 serves to pump the fluid through the heat exchanger and along a return conduit 40 to the scrubber 14. Additional make-up water to replace that lost in removing the waste in the water clarifier 36 is added to the outlet conduit 40 through a supply conduit schematically indicated in the drawing by the arrow 42. It is understood that the first stage of scrubber 14 is provided with an individual water recirculation and clarification system (not shown) similar to that of the second scrubber stage.

The quantity of preheated ambient air that must be added to the combustion gases to preclude steam plume formation is a function of the volume flow rate of the combustion gas, the relative atmospheric humidity, the ambient air temperature, etc., all as is well understood in the art. In order to meter an appropriate amount of preheated air to the stack 26, the induced draft fan 28 is provided with a control circuit 44. The control 44 may provide for manual regulation of the air volume inducted into the system by fan 28 or alternatively may include humidistatic and thermostatic controls to provide automatic regulation of the ambient air volume accepted into the system. Such manual and automatic controls are well known to the art and, therefore, will not be discussed in detail herein.

Figure 2:
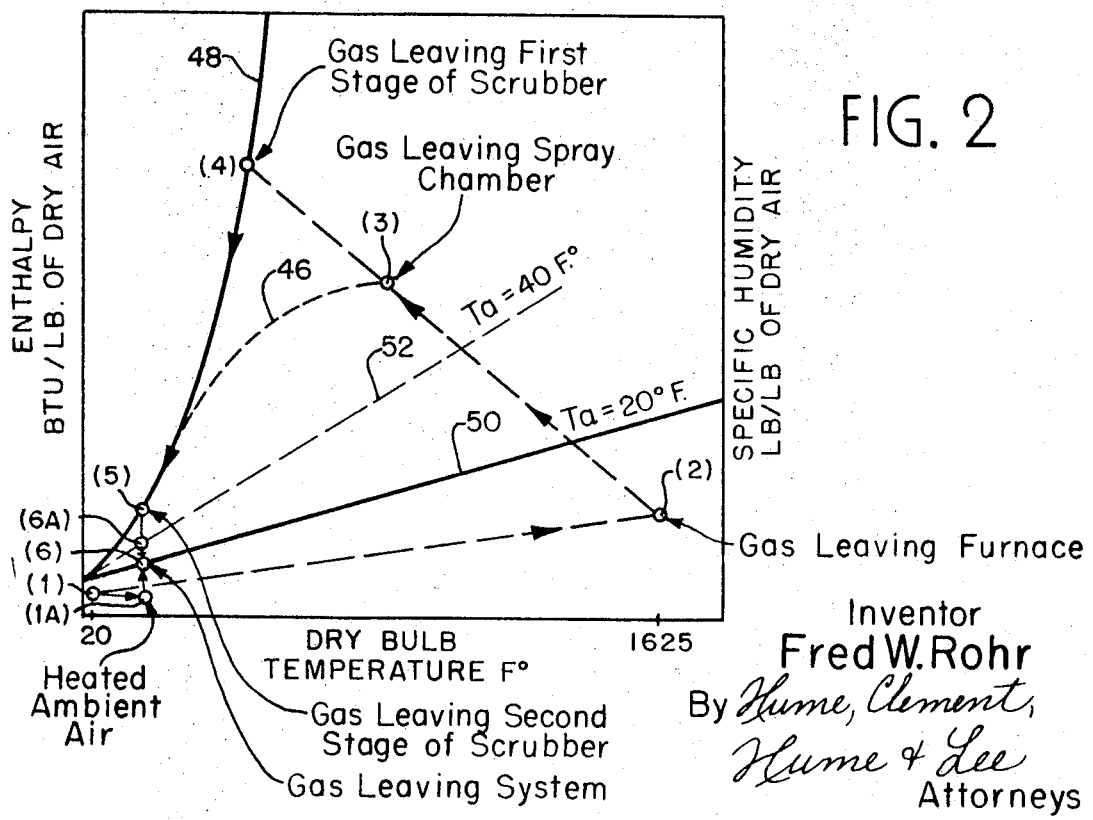
FIG. 2 is a psychrometic chart useful in understanding the operation of the system of FIG. 1 and showing the thermodynamic state points of the combustion gases at the various stages of the system.

The operation of the system of the invention can best be understood by reference to the psychrometric chart of FIG. 2 which illustrates the thermodynamic state points of the gases at the various stages in the system under exemplary system operating conditions. The psychrometric chart is in conventional form plotting dry bulb temperature in degrees Fahrenheit along the abscissa versus enthalpy or specific humidity along the ordinate of the graph. Specifically, air entering the furnace 10 at the assumed ambient temperature of 20 degrees Fahrenheit exits to the conduit 12 as a constituent of the combustion gas at an assumed temperature of 1625 degrees Fahrenheit as denoted by the state point (2) on the graph.

The gases at the state point (2) are of a higher moisture content than the air introduced into the furnace due to formation of water vapor as a by-product of the combustion process, release of moisture from the matter being burned, etc. as indicated earlier herein. After leaving the furnace chamber, the gases may pass through a combustion or settling chamber (not shown) where a cooling effect of approximately 100 degrees Fahrenheit or more may take place under constant moisture content conditions. However, in the present example it is assumed that no such heat loss takes place between the furnace outlet 12 and the entrance to the spray chamber 16.

The purpose of the spray chamber 16 is merely to reduce the temperature of the intensely hot combustion gases to a level acceptable to the succeeding two-stage scrubber 14. Assuming that the water in the spray chamber is sprayed into the combustion gases at the wet-bulb temperature of the gases and that make-up water to replace evaporation losses is supplied at a like temperature, the gases will follow a constant wet-bulb line (adiabatic saturation line) as shown between the state points (2) and (3) of the graph. The temperature of the gases leaving the spray chamber at the state point (3) is typically on the order of 600 degrees Fahrenheit.

The combustion gases in this conditon next pass to the conventonal scrubber unit 14 whereat water sprays are introduced into the gases under conditions suitable for removing substantially all of the particulate matter carried in suspension by the combustion gases. For convenience and clarity of explanation, it is assumed that the scrubber 14 is constituted in two stages and that the first stage effects, incident to scrubbing the gases, a change in their temperature-humidity condition from that denoted by the state point (3) to a saturation condition denoted by the state point (4) located at an intercept with the saturation curve 48. The saturation curve 48, of course, represents the locus of points defining the maximum quantity of moisture that the gases are able to contain at each dry bulb temperature value; a further cooling of the saturated gas results in a condensation of the water vapor carried thereby.

In view of the fact that the gases leave the first scrubber stage in a saturated condition, the gases in the second scrubber stage are therefore confined to follow the contour of the saturation curve during their transition between the state points (4) and (5), both of which state points lie on the saturation curve 48. As previously stated, the water systems for the first and second stages of the scrubber are separate each with its own pumping and clarification means as required. Depending on the manner of the process and the resulting economic advantages, the cooling and humidification process occurring in the first stage of the scrubber and the dehumidification and cooling process occurring in the second stage of the scrubber may be combined in a single scrubber unit. It will be understood by those skilled in the art that under more general conditions as, for example, where the treatment of the gases occurs in a single scrubber stage, the transition of the gases between the state points (3) and (5) will follow a more complex or generalized thermodynamic path such as represented graphically by the dotted line 46 interconnecting the state points (3) and (5).

In summary, the gases in the first scrubber stage are assumed to follow a constant wet bulb line from state points (3) to (4) and to exit from the first stage at a temperature of 174 degrees Fahrenheit. The gases entering the second scrubber stage at the state point (4) are not, as previously stated, able to support additional moisture so that the further scrubbing and cooling of the combustion gases therein to their exit temperature of 110 degrees Fahrenheit results in a temperature humidity transition along the solid-line saturation curve 48 from the state point (4) to (5). Accordingly, the second scrubber stage, in addition to removing further particulate matter from the gases, also effects a dehydration of the gases with the excess moisture condensing and being collected at an outlet drain for use in heating the ambient air and for repeated use in the scrubber subsequent, of course, to suitable clarification. It is seen from the chart of FIG. 2 that substantially all of the water added to the gases in the spray chamber 16 and the first stage of the scrubber 14 is recovered by condensation of the water vapor in the second scubber stage and is available for reuse, thereby promoting an overall system economy.

The water recovered from the second stage of the scrubber 14 is of an increased temperature due to the intimate contact of the scrubber water with the saturated combustion gases leaving the first scrubber stage. This water, after clarification in the water clarifier 36, is circulated by the pump 38 through the second passageway of the heat exchanger 30 whereat it is utilized to heat the ambient air passed through the first heat exchanger passageway under the influence of the fan 28. The resulant warming of the ambient air is represented by the horizontal line connecting the state points (1) and (1a) on the chart. In this regard, the water clarifier system 36 is selected to be of a type having a comparatively short retention time thereby to avoid significant heat loss prior to entry of the clarified water into the heat exchanger 30. It is, of course, preferred that the water clarifier 36 precede the heat exchanger to preclude chemical damage or clogging of the heat exchanger ducts by the contaminants carried in the water. On the other hand, if the heat exchanger 30 is substantially immune to such contaminants, the water clarifier 36 may be coupled in the outlet line 40. In this case, a settling tank or some similar water clarifier may be used to both remove the sludge, etc. from the water and to provide any additional cooling thereof deemed desirable or necessary. At any rate, it is contemplated that the water in the outlet duct 40 shall have been cooled sufficiently in the heat exchanger 30 and in such ancillary cooling means as may be provided so that the water is in condition for reintroduction into the scrubber 14.

The relative quantity of preheated ambient air required for intermixing with the combustion gases to avoid formation of a steam plume is a function of the temperature and humidity of both the scrubbed combustion gases and the preheated ambient air (denoted respectively by the state points (5) and (1a) on the chart) as well as the temperature of the ambient air into which the gases are to be discharged. This relative quantity of ambient air may reliably be determined from the chart of FIG. 2 for any given ambient temperature condition. Specifically, a steam plume will not be formed as long as the moisture content of the stack gases is of a value lying at or below a line tangent to the saturation curve at a point equal to the dry bulb temperature of the ambient air. In the present example, the line 50 is drawn tangent to the saturation curve 48 at the assumed dry bulb ambient temperature of 20 degrees Fahrenheit. Thus, if the intermixed gases leaving the system are of a moisture content at or below that represented by state point (6) on the graph, a steam plume will not be formed.

In the present example wherein the preheated ambient air is assumed to be of a temperature of 80 degrees Fahrenheit and the gases at state point (5) are at 110 degrees Fahrenheit, a steam plume will not be formed at an ambient air temperature of 20 degrees Fahrenheit as long as the preheated ambient air is intermixed with the combustion gas in a ratio of 5 to 1, i.e. ratio of the distance from (5) to (6) to the distance from (1a) to (6). A progressively smaller amount of preheated ambient air is required for intermixture with the combustion gases as the temperature of the ambient air increases. This is exemplified by the dashed line 52 which is tangent to the saturation curve 48 at a temperature of 40 degrees Fahrenheit and which intersects the line joining state points (1a) and (5) at the state point (6a). The state point (6a) lies significantly above the state point (6) thereby denoting that a substantially lesser quantity of preheated ambient air is required to preclude steam plume formation at an ambient temperature of 40° F. than at 20° F. The correct quantity of preheated ambient air is provided by suitably regulating the volume flow rate of the fan 28 through adjustment of its associated control 44.

While a particular embodiment of the present invention has been shown and described, it is apparent that various changes and modifications may be made, and it is therefore intended in the following claims to cover all such modifications and changes as may fall within the true spirit and scope of this invention.

I claim:
1. The method of removing particulate matter from heated gases and suppressing formation of a steam plume upon discharge of said gases to the atmosphere, comprising the steps of:
   scrubbing said heated gases with a fluid for removing particulate matter therefrom and collecting said fluid used to scrub said heated gases;
   cooling said gases substantially below their dew point temperature for correspondingly reducing the moisture content of said gases;
   clarifying said collected fluid;
   circulating the clarified fluid through a second passageway of a heat exchanger to cool said fluid for reuse in said scrubbing step;
   preheating a controlled quantity of ambient air as determined by the temperature and humidity condition of each of said scrubbed gases, said ambient air and said preheated ambient air, said ambient air being preheated by passage through a first passageway of said heat exchanger whereby said fluid in said second passageway is correspondingly cooled through thermal contact with said ambient air in said first passageway;
   and intermixing said controlled quantity of preheated ambient air and said scrubbed gases in predetermined proportions prior to discharge of said intermixture to the atmosphere to suppress formation of a steam plume.

2. The method of claim 1 in which the cooling of said gases substantially below their dew point temperature is accomplished by continued introduction into said gases of a scrubbing fluid having a temperature substantially lower than that of said gases.

References Cited
UNITED STATES PATENTS

| | | | |
|---|---|---|---|
| 2,252,738 | 8/1941 | Stoever | 55—85 X |
| 3,232,027 | 2/1966 | Lorenz et al. | 55—93 X |
| 3,382,649 | 5/1968 | Richmond | 55—84 |

JOHN ADEE, Primary Examiner

U.S. Cl. X.R.

55—93